US010406867B2

(12) United States Patent
Izuhara

(10) Patent No.: US 10,406,867 B2
(45) Date of Patent: Sep. 10, 2019

(54) PNEUMATIC TIRE

(71) Applicant: TOYO TIRE & RUBBER CO., LTD., Osaka-shi, Osaka (JP)

(72) Inventor: Yuji Izuhara, Osaka (JP)

(73) Assignee: TOYO TIRE CORPORATION, Itami-shi, Hyogo (JP)

(*) Notice: Subject to any disclaimer, the term of this patent is extended or adjusted under 35 U.S.C. 154(b) by 197 days.

(21) Appl. No.: 15/260,985

(22) Filed: Sep. 9, 2016

(65) Prior Publication Data

US 2017/0087941 A1    Mar. 30, 2017

(30) Foreign Application Priority Data

Sep. 28, 2015   (JP) ................................. 2015-190151

(51) Int. Cl.
    *B60C 15/06*    (2006.01)
    *B60C 15/00*    (2006.01)
    *B60C 15/04*    (2006.01)

(52) U.S. Cl.
CPC .......... *B60C 15/06* (2013.01); *B60C 15/0027* (2013.01); *B60C 15/04* (2013.01); *B60C 15/0635* (2013.01); *B60C 2015/009* (2013.01); *B60C 2015/061* (2013.01); *B60C 2015/0614* (2013.01); *B60C 2015/0621* (2013.01); *B60C 2200/06* (2013.01)

(58) Field of Classification Search
CPC .. B60C 15/06; B60C 15/0628; B60C 15/0635
See application file for complete search history.

(56) References Cited

U.S. PATENT DOCUMENTS

2009/0294011 A1* 12/2009 Maruoka ................ B60C 15/06
    152/540

FOREIGN PATENT DOCUMENTS

| CN | 104723804 A | | 6/2015 |
|---|---|---|---|
| JP | 59-102604 | * | 6/1984 |
| JP | 3-67710 A | | 3/1991 |
| JP | 04-189607 | * | 7/1992 |
| JP | 07-101212 | * | 4/1995 |
| JP | 2014-118012 A | | 6/2014 |
| JP | 2015-116973 | * | 6/2015 |

OTHER PUBLICATIONS

English machine translation of JP59-102604. (Year: 1984).*
English machine translation of JP04-189607. (Year: 1992).*
English machine translation of JP07-101212. (Year: 1995).*
English machine translation of JP2015-116973. (Year: 2015).*
Office Action dated Aug. 3, 2017, issued in counterpart Chinese Application No. 201610674698.4, with English translation. (14 pages).
Office Action dated May 14, 2019, issued in counterpart JP Application No. 2015-190151, with English translation (7 pages).

* cited by examiner

*Primary Examiner* — Robert C Dye
(74) *Attorney, Agent, or Firm* — Westerman, Hattori, Daniels & Adrian, LLP

(57) ABSTRACT

A pneumatic tire that includes a pair of bead cores, a pair of bead fillers connected to the bead cores respectively, a ply which extends between the bead cores; steel chafers disposed outside the ply, and inner nylon chafers disposed outside the steel chafers. The inner nylon chafers extend upward from positions in the vicinity of heels of the bead cores. The pneumatic tire also includes outer nylon chafers are disposed outside the inner nylon chafer.

8 Claims, 6 Drawing Sheets

PNEUMATIC TIRE

CROSS-REFERENCE TO RELATED APPLICATIONS

This application claims priority from Japanese Patent Application No. 2015-190151 filed on Sep. 28, 2015, the disclosures of which are incorporated herein by reference in their entireties.

BACKGROUND OF THE INVENTION

Field of the Invention

The present invention relates to a pneumatic tire.

Description of Related Art

Conventionally, as a pneumatic tire, there has been known a pneumatic tire where a steel cord protective layer is disposed outside a bead core, and organic fiber protective layers are disposed outside the steel cord protective layer (see JP-A-3-67710, for example).

Further, as another pneumatic tire, there has been known a pneumatic tire where a carcass layer is disposed outside a bead core, and a two-layer-stacked reinforcing layer (protective layer) is disposed outside the carcass layer (see JP-A-2014-118012, for example).

However, in both pneumatic tires, the protective layer is disposed in a wide range around the bead core. Due to such a configuration, an entire weight of the pneumatic tire becomes large. Further, although heat is generated in the tire during traveling of a vehicle, heat radiation is liable to become insufficient. Accordingly, peeling off of the protective layer from the bead core or the like occurs and hence, durability of the bead core is deteriorated.

SUMMARY OF THE INVENTION

The present invention has been accomplished in view of the above circumstances, and it is an object of the present invention to provide a pneumatic tire which can prevent the deterioration of durability of a bead core due to heat generation while suppressing the generation of a distortion in respective parts during traveling without increasing a weight of the pneumatic tire.

In order to solve the problem mentioned above, the present invention provides a pneumatic tire including:

a pair of bead cores;

a pair of bead fillers connected to the bead cores respectively;

a ply which extends between the bead cores;

steel chafers disposed outside the ply;

inner nylon chafers disposed outside the steel chafers, the inner nylon chafers extending upward from positions in the vicinity of heels of the bead cores; and outer nylon chafers disposed outside the inner nylon chafer, wherein assuming a distance from a reference position of the bead core to an outer end portion of the steel chafer as H1, a distance from the reference position of the bead core to an outer end portion of the ply as H2, a distance from the reference position of the bead core to an outer end portion of the outer nylon chafer as H3, a distance from the reference position of the bead core to an inner end portion of the steel chafer as H4, and a distance from the reference position of the bead core to the upper end portion of the inner nylon chafer as H5, a following relationship is satisfied.

$$H1 < H2 < H3 < H4 < H5$$

With such a configuration, the inner nylon chafer positioned above the outer end portion of the outer nylon chafer effectively prevents distortion at the outer end portion of the ply. Accordingly, plastic deformation of the ply at the bead portion is suppressed and hence, durability of the bead portion can be enhanced. Further, by disposing the lower end portion of the inner nylon chafer in the vicinity of the heel of the bead core, rubber having a sufficient thickness can be interposed below the bead core. Further, by limiting a range where both nylon chafers are disposed, an entire weight of the tire can be suppressed.

According to another preferred aspect of the present invention, the pneumatic tire further includes an outer rubber layer outside of the outer nylon chafer, and is that assuming a shortest distance between an inner edge of the outer end portion of the outer nylon chafer and an inner surface of the bead filler as T1, and a shortest distance between an outer edge of the outer end portion of the outer nylon chafer and an outer surface of the outer rubber layer as T2, a following relationship be satisfied.

$$1.5 \times T2 < T1 < 2.0 \times T2$$

With such a configuration, distortion at the outer end portion of the outer nylon chafer can be suppressed by rubber disposed on the outside of the outer end portion of the outer nylon chafer and having a large thickness. Accordingly, plastic deformation of the outer nylon chafer at the bead portion can be suppressed and hence, durability of the bead portion can be enhanced.

According to another preferred aspect of the present invention, the pneumatic tire further includes an outer rubber layer outside of the outer nylon chafer, and is that assuming a shortest distance between an inner edge of the upper end portion of the inner nylon chafer and an inner surface of the bead filler continuously formed with the bead core as T3, and a shortest distance between an outer edge of the upper end portion of the inner nylon chafer and an outer surface of the outer rubber layer as T4, a following relationship be satisfied.

$$1.1 \times T3 < T4 < 1.5 \times T3$$

With such a configuration, distortion at the upper end portion of the inner nylon chafer can be suppressed by rubber disposed on the outside of the upper end portion of the inner nylon chafer and having a large thickness. Accordingly, plastic deformation of the inner nylon chafer at the bead portion can be suppressed and hence, durability of the bead portion can be enhanced.

It is preferable that a rubber layer be disposed between the bead filler and the inner nylon chafer, assuming a distance from the reference position of the bead core to the inner end portion of the outer nylon chafer as H6, the distance H5 be substantially equal to the distance H6, and assuming a distance from the outer end portion of the outer nylon chafer to an upper end portion of the rubber layer as H7, a following relationship be satisfied.

$$2.5 \times H7 \leq H5 \, (H6) \leq 3.0 \times H7$$

With such a configuration, distortion at the outer end portion of the ply and distortion in the inner end portion of the steel chafer can be suppressed.

It is preferable that assuming a height of the tire as H, a following relationship be satisfied.

$$0.10 \times H \leq H2 \leq 0.25 \times H$$

With such a configuration, distortion at the outer end portion of the ply can be suppressed.

It is preferable that all of following relationships be satisfied.

$0.50 \times H2 \leq H1 \leq 0.70 \times H2$, $1.10 \times H2 \leq H3 \leq 1.40 \times H2$, $1.35 \times H2 \leq H4 \leq 1.65 \times H2$, $1.15 \times H2 \leq H5 \leq 1.40 \times H2$, and $1.40 \times H2 \leq H6 \leq 1.65 \times H2$ With such a configuration, distortion at the respective end portions of the constitutional parts can be suppressed.

According to the present invention, by establishing the proper relationships with respect to the distances from the reference position of the head core to the end portions of the respective constitutional parts, and by limiting the range where the inner nylon chafer is disposed, the reduction of weight of the bead portion can be acquired while durability of the bead portion is enhanced. Further, a sufficient amount of rubber can be interposed below the bead core.

BRIEF DESCRIPTION OF THE DRAWINGS

The foregoing and the other feature of the present invention will become apparent from the following description and drawings of an illustrative embodiment of the invention in which.

DETAILED DESCRIPTION OF THE PREFERRED EMBODIMENT

Hereinafter, an embodiment according to the present invention is described with reference to attached drawings. The description made hereinafter is provided substantially for merely illustrating the present invention, and the description does not intend to limit the present invention, a product to which the present invention is applied or a usage where the present invention is used. Further, the drawings are schematic drawings, and ratios between the respective sizes may differ from actual corresponding ratios and the like.

Figure 1:
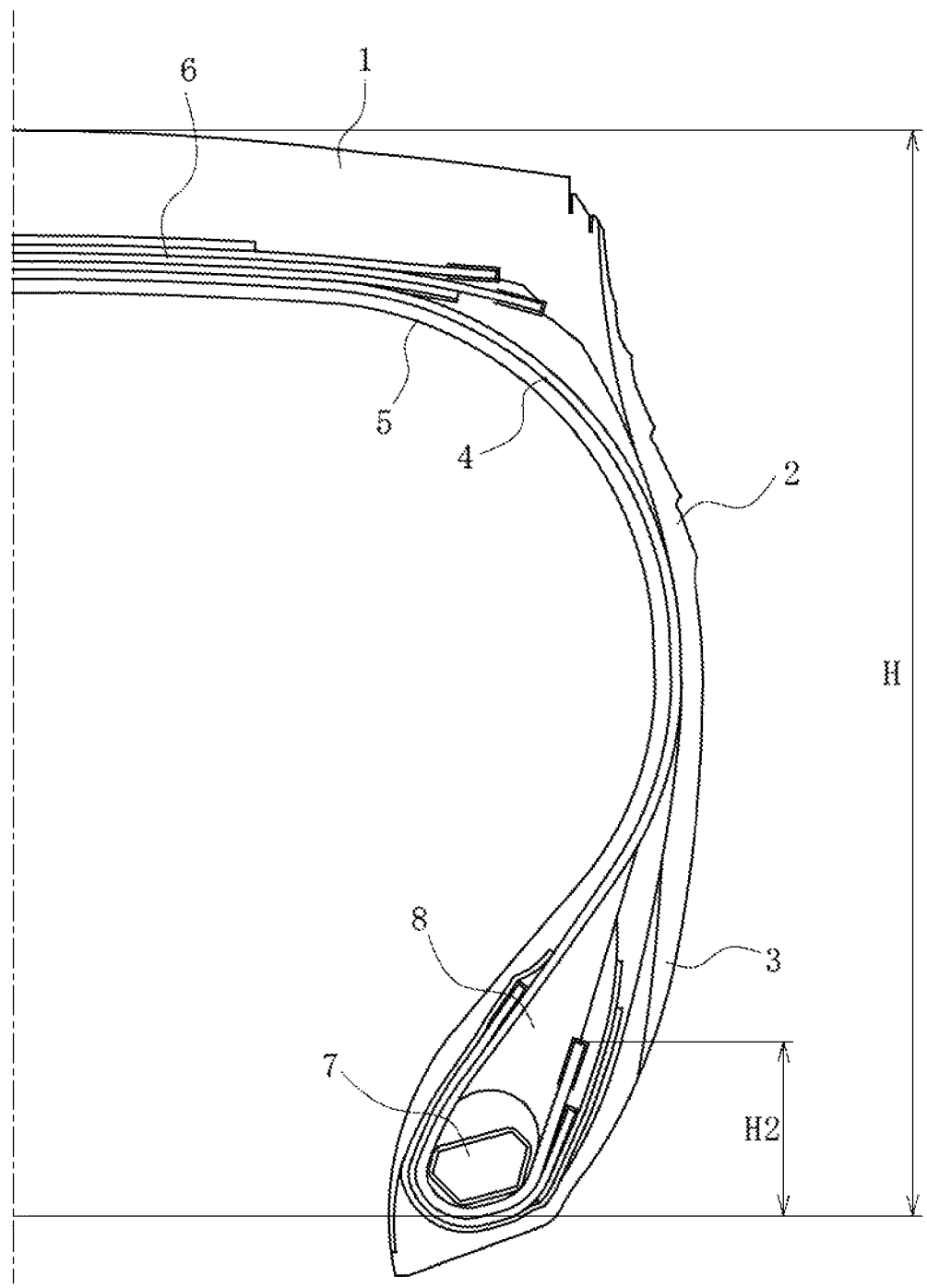
FIG. 1 is a meridian half sectional view of a pneumatic tire according to an embodiment of the present invention.

FIG. 1 is a meridian half sectional view of a pneumatic tire according to this embodiment. The pneumatic tire includes: a tread portion 1, a pair of side portions 2, and a pair of bead portions 3. A ply 4 (carcass ply) extends between the bead portions 3. A tire inner diameter side of the ply 4 is formed of an inner liner 5. In the tread portion 1, a belt 6 in plural layers is wound around a tire outer diameter side of the ply 4 in the tire circumferential direction. Hereinafter, the bead portion 3 where a technical feature of the present invention lies is described in detail.

Figure 2:
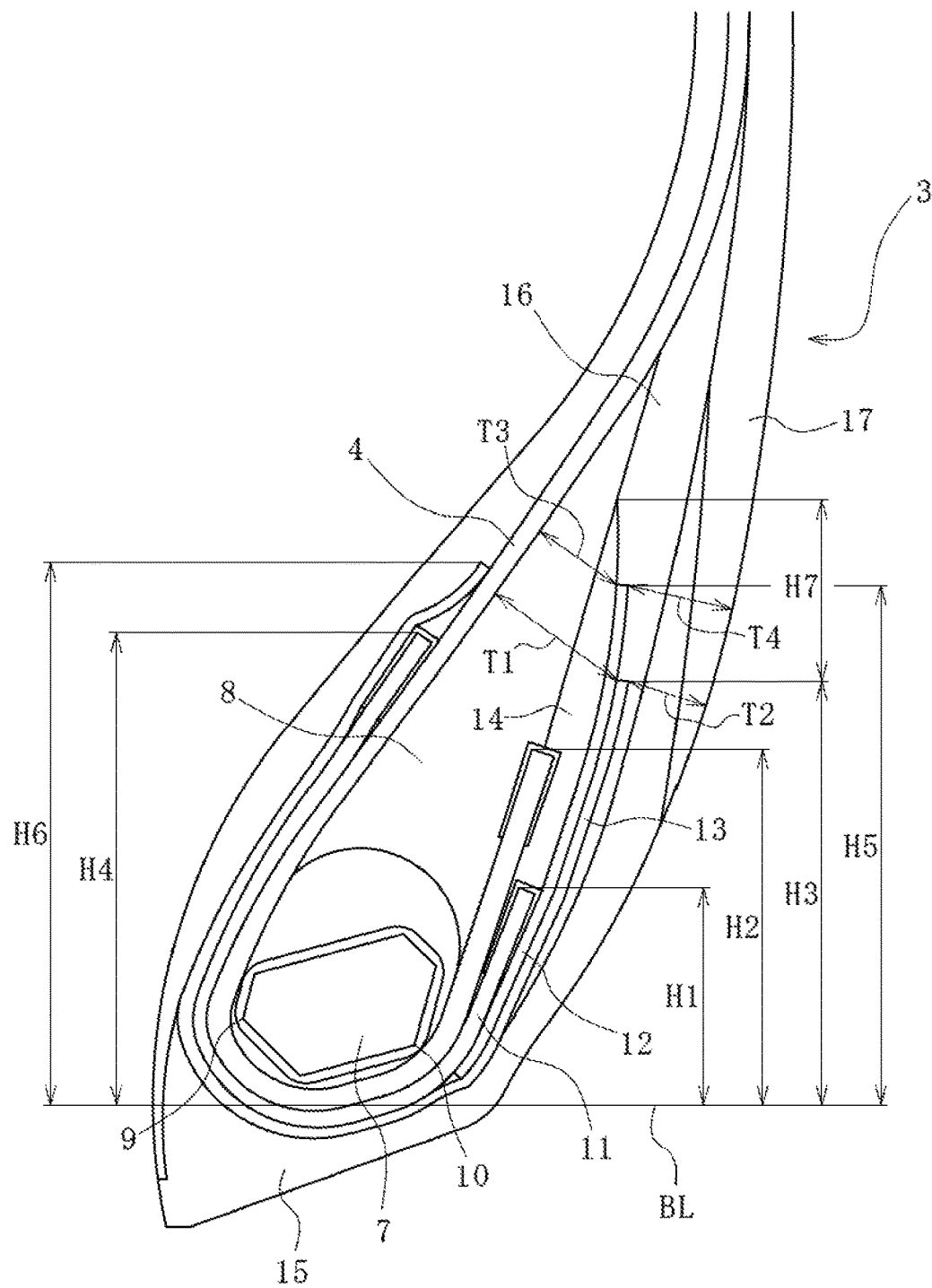
FIG. 2 is an enlarged view of a bead portion shown in FIG. 1.

As shown in FIG. 2, the bead portion 3 includes a bead core 7 and a bead filler 8 which is formed continuously with an upper side of the bead core 7. The bead core 7 is formed such that a plurality of bead wires are formed in bundles having a hexagonal shape in cross section and are annularly connected to each other. In this embodiment, the bead core 7 is inclined such that a major axis of the bead core 7 is gradually directed downward toward the inside of the tire. A most projecting portion of the bead core 7 forms a tow 9, and a lower right corner portion of the bead core 7 forms a heel 10. The bead filler 8 is made of a rubber material, and is formed into a triangular shape in cross section. The bead filler 8 is formed into an annular shape along an upper surface of an annular shape of the head core 7. The bead filler 8 is provided for reinforcing the bead core 7.

One end side of the ply 4 is disposed along an outer surface of the bead core 7 and an outer surface of the bead filler 8. An outer end portion of the ply 4 has a length approximately half of a length of the bead filler 8 (a projection distance from the bead core 7). A steel chafer 11, an inner nylon chafer 12, and an outer nylon chafer 13 are disposed on an outer surface of the ply 4 in this order.

Figure 3:
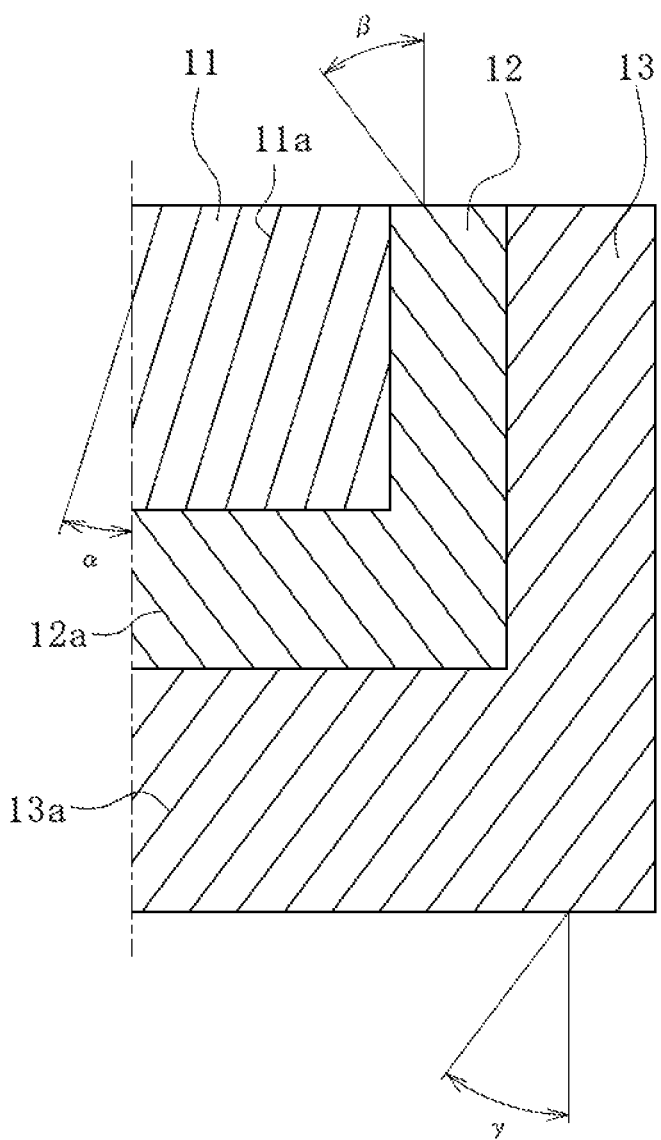
FIG. 3 is a plane view showing a declined direction of each wire of a steel chafer, an inside nylon chafer and an outside nylon chafer shown in FIG. 2.

As shown in FIG. 3, the steel chafer 11 has a strip shape and is formed such that a plurality of steel wires are disposed parallel to each other and rubber is applied to the wires by coating. Steel wires 11a are disposed in an inclined manner with respect to a tire circumferential direction. To describe the inclination direction of the steel wires 11a, assuming the outside in the tire width direction with respect to the tire circumferential direction as a plus side, and the inside in the tire width direction with respect to the tire circumferential direction as a minus side, an inclination angle α of the steel wire 11a is set to a value which falls within a range from +20° to −40° in a state where the steel chafer 11 is disposed on a horizontal plane. The steel chafer 11 is disposed such that the steel chafer 11 is wound around the bead core 7 from an inner side to the outer side of the bead core 7, an outer end portion of the steel chafer 11 extends upward slightly above the bead core 7, and an inner end portion of the steel chafer 11 extends with a length which slightly exceeds half of the length of the bead filler 8.

The inner nylon chafer 12 has a strip shape and is formed such that a plurality of nylon wires 12a are disposed parallel to each other and rubber is applied to the wires 12a by coating. An inclination angle β of the nylon wires 12a is set to a value which falls within a range from −30° to −50° in a state where the inner nylon chafer 12 is disposed on a horizontal plane. The inner nylon chafer 12 is disposed on an outer surface side of the steel chafer 11 disposed on the outer surface side of the bead core 7. A lower end of inner nylon chafer 12 extends upward from a position disposed in the vicinity of the heel of the bead core 7 which is disposed on the lower end side of the bead portion 3. An upper end portion of the inner nylon chafer 12 exceeds the outer end portion of the ply 4. The lower end portion of the inner nylon chafer 12 is disposed in the vicinity of the heel of the bead core 7 so that the inner nylon chafer 12 is not positioned below the bead core 7.

Returning to FIG. 2, between the inner nylon chafer 12 and the bead filler 8, an inner rubber layer 14 is formed at a portion above the outer end portion of the ply 4 and the outer end portion of the steel chafer 11. The inner rubber layer 14 extends above the upper end portion of the inner nylon chafer 12.

As shown in FIG. 3, in the same manner as the inner nylon chafer 12, the outer nylon chafer 13 has a strip shape and is formed such that a plurality of nylon wires 13a are disposed parallel to each other and rubber is applied to the wires 13a by coating. An inclination angle γ of the nylon wires 13a is set to a value which falls within a range from +30° to +50° in a state where the inner nylon chafer 12 is disposed on a horizontal plane. That is, with respect to the tire circumferential direction, the nylon wires 13a are inclined in the direction opposite to the direction that the nylon wires 12a of the inner nylon chafer 12 are inclined. The outer nylon chafer 13 is disposed on the outer surface side of the steel chafer 11. An inner end portion of the outer nylon chafer 13 extends slightly above the inner end portion of the steel chafer 11, and an outer end portion of the outer nylon chafer 13 is disposed slightly below an outer end portion of the inner nylon chafer 12.

Returning to FIG. 2, a chafer rubber layer 15 is disposed on an outer surface of a lower side of the outer nylon chafer 13. As described above, the lower end portion of the inner nylon chafer 12 starts from the position in the vicinity of the heel of the bead core 7, and the inner nylon chafer 12 does not extend to a lower side of the bead portion 3. Accordingly, a thickness of the chafer rubber layer 15 can be increased by an amount that the inner nylon chafer 12 is not formed.

An intermediate rubber layer 16 is formed such that the intermediate rubber layer 16 covers the outer nylon chafer 13, a portion of the inner nylon chafer 12 exposed above the outer nylon chafer 13, a portion of the inner rubber layer 14 exposed above the inner nylon chafer 12, a portion of the bead filler 8 exposed above the inner rubber layer 14, and a portion of the ply 4 disposed above the bead filler 8. A lower half portion of the intermediate rubber layer 16 is covered by the chafer rubber layer 15, and an upper portion of the chafer rubber layer 15 and an upper portion of the intermediate rubber layer 16 are covered by an outer rubber layer 17 which forms the side portion 2.

Here, the distance relationship between the respective members which form the bead portion 3 is described with reference to a distance from a reference position (reference line) BL of the bead portion 3. An arbitrary position disposed slightly below the lowest end position of the bead core 7 is used as the reference position BL of the bead portion 3.

Distances between respective members are set as follows.
height of tire: H
distance from reference position BL to outer end portion of steel chafer 11: H1
distance from reference position BL to outer end portion of ply 4: H2
distance from reference position BL to outer end portion of outer nylon chafer 13: H3
distance from reference position BL to inner end portion of steel chafer 11: H4
distance from reference position BL to upper end portion of inner nylon chafer 12: H5
distance from reference position BL to inner end portion of outer nylon chafer: H6
distance from outer end portion of outer nylon chafer to upper end portion of outer rubber layer: H7
shortest distance between inner edge of outer end portion of outer nylon chafer and inner surface of bead filler 8: T1
shortest distance between outer edge of outer end portion of outer nylon chafer and outer surface of outer rubber layer: T2
shortest distance between inner edge of upper end portion of inner nylon chafer 12 and inner surface of bead filler 8 which is continuously formed with bead core 7: T3
shortest distance between outer edge of upper end portion of inner nylon chafer 12 and outer surface of outer rubber layer: T4

By setting the respective distances as described above, the following relationships (1) to (10) are established. These relationships can be established individually and can also be established in combination.

$$H1<H2<H3<H4<H5 \tag{1}$$

$$1.5 \times T2 < T1 < 2.0 \times T2 \tag{2}$$

$$1.1 \times T3 < T4 < 1.5 \times T3 \tag{3}$$

$$2.5 \times H7 \leq H5(H6) \leq 3.0 \times H7 \ (H5 \text{ and } H6 \text{ being substantially equal}) \tag{4}$$

$$0.10 \times H \leq H2 \leq 0.25 \times H \tag{5}$$

$$0.50 \times H2 \leq H1 \leq 0.70 \times H2 \tag{6}$$

$$1.10 \times H2 \leq H3 \leq 1.40 \times H2 \tag{7}$$

$$1.35 \times H2 \leq H4 \leq 1.65 \times H2 \tag{8}$$

$$1.15 \times H2 \leq H5 \leq 1.40 \times H2 \tag{9}$$

$$1.40 \times H2 \leq H6 \leq 1.65 \times H2 \tag{10}$$

Particularly, with the configuration which satisfies the relationship (1), there is no possibility that positions of end portions of the respective members overlap with each other in the thickness direction so that the generation of distortion or the like can be effectively prevented. Further, a rubber layer disposed on the outer surface side of the bead portion 3 is formed of the inner rubber layer 14, the intermediate rubber layer 16 and the outer rubber layer 17 so that it is possible to allow the rubber layer disposed on the outer surface side of the bead portion 3 to have a sufficient thickness while suppressing a projecting size of the rubber layer to the outside. The outer end portion of the ply 4 can be pressed by the inner nylon chafer 12 so that the generation of distortion of the portion can be effectively prevented.

With the configuration which satisfies the relationship (4), a state where the ply 4 is pressed by the upper end portion of the inner nylon chafer 12 and a state where the ply 4 is pressed by the inner end portion of the outer nylon chafer 13 can be made substantially equal. With such a configuration, it is possible to suppress distortion of the outer end portion of the ply 4 and distortion of the inner end portion of the steel chafer 11. Further, by setting a ratio of a height of the inner nylon chafer 12 to a height of the inner rubber including a portion which is not pressed by the inner nylon chafer 12 from the reference position BL to approximately 70%, it is possible to prevent the increase of a thickness of the bead portion 3 more than necessity thus preventing the increase of weight of the pneumatic tire.

With the configuration which satisfies the relationships (6) to (10), the respective members can be arranged in a properly balanced manner and hence, the generation of distortion at ends of the respective members can be suppressed.

EXAMPLES

Tires having bead portions 3 which differ variously from each other in cross-sectional shape are prepared, and durability and weight of the tires are tested. The result of the test is described below. In this test, each pneumatic tire is mounted on a rim having a size of 22.5×7.50. An internal pressure of the pneumatic tire is set to 900 kPa by filling the pneumatic tire with air. Each tire is mounted on a steel drum having a radius of 1.7 m and a flat surface by applying a pressure which is 210% of a reference load specified in JATMA. A load is increased by 10% each time a vehicle traveled for 168 hours at a speed of 40 km/h at a room temperature of 40° C. Each tire is kept traveling until the bead portion 3 is broken. In Table 1, in the column "durability", durability of the bead portion 3 of a comparison example 2 is set to 100 as the reference value, and durabilities of the bead portions 3 of other examples are indicated by indexes. In the column "durability", the larger a numerical value, the larger durability of the bead portion 3 is. In the column "weight", in the same manner as durability, a weight of the bead portion 3 of the comparison example 2 is set to 100 as the reference value, and weights of the bead portions 3 of other examples are indicated by indexes. In the column "weight", the smaller a numerical value, the smaller a weight of the bead portion 3 is.

heel 10 of a bead core 7, and an outer nylon chafer is disposed around the bead core 7. Further, the relationship T3<T4 is set. A distance H5 is set to 2.65×H7 (H5=2.65×H7) and a distance H6 is set to 2.75×H7 (H6=2.75×H7) so that both the distance H5 and the distance H6 are set to values which fall within a range of the relationship (4).

Figure 8:
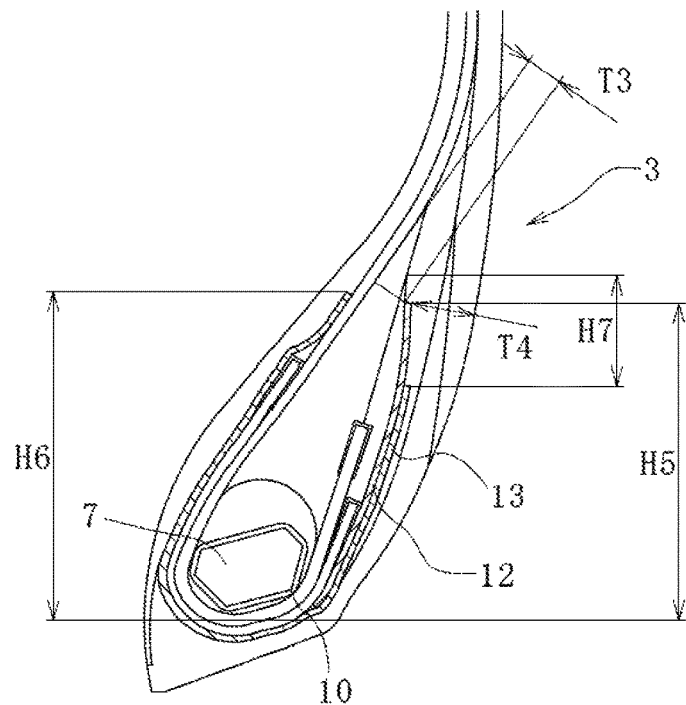
FIG. 8 is a meridian half sectional view of a pneumatic tire according to an example 2.

In an example 2, as shown in FIG. 8, a lower end portion of an inner nylon chafer 12 is disposed in the vicinity of a heel 10 of a bead core 7, and an outer nylon chafer is disposed around the bead core 7. Further, the relationship T3<T4 is set. A distance H5 is set to 2.9×H7 (H5=2.9×H7) and a distance H6 is set to 3.0×H7 (H6=3.0×H7) so that both the distance H5 and the distance H6 are set to values which fall within a range of the relationship (4).

Figure 9:
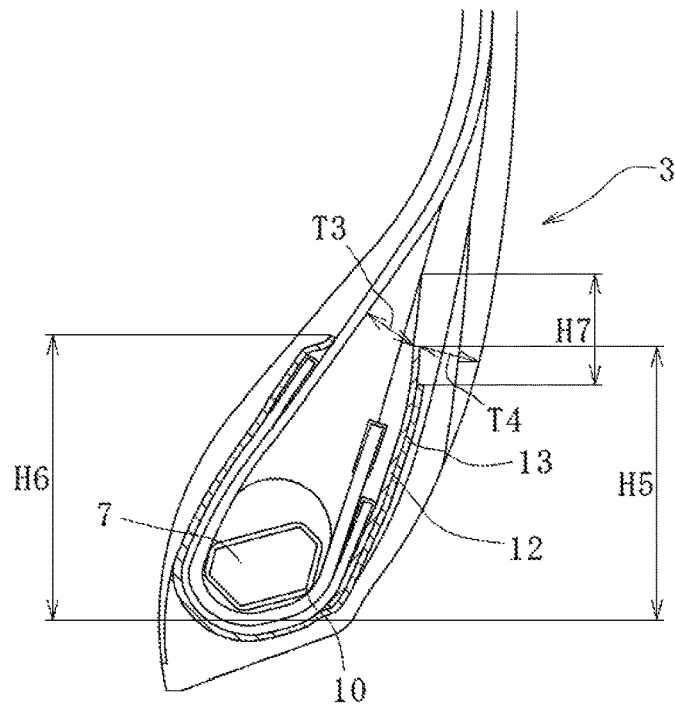
FIG. 9 is a meridian half sectional view of a pneumatic tire according to an example 3.

In an example 3, as shown in FIG. 9, a lower end portion of an inner nylon chafer 12 is disposed in the vicinity of a heel 10 of a bead core 7, and an outer nylon chafer is disposed around the head core 7. Further, the relationship T3<T4 is set. A distance H5 is set to 2.5×H7 (H5=2.5×H7) and a distance H6 is set to 2.6×H7 (H6=2.6×H7) so that both the distance H5 and the distance H6 are set to values which fall within a range of the relationship (4).

TABLE 1

| Configuration | Outer NC: stopped at heel Inner NC: wound around | Inner NC: stopped at heel Outer NC: wound around | Inner NC: stopped at heel Outer NC: wound around | Inner NC: stopped at heel Outer NC: wound around | Inner NC: stopped at heel Outer NC: wound around | Inner NC: stopped at heel Outer NC: wound around |
|---|---|---|---|---|---|---|
| Thickness | $T4 < T3$ | $T3 < T4$ | $T4 < T3$ | $T3 < T4$ | $T3 < T4$ | $T3 < T4$ |
| H5, H6 | $H5 = 3.5 \times H7$ | $H5 = 3.2 \times H7$ | $H5 = 2.3 \times H7$ | $H5 = 2.65 \times H7$ | $H5 = 2.9 \times H7$ | $H5 = 2.5 \times H7$ |
| H7 = 20 | $H5 = 2.75 \times H7$ | $H6 = 3.3 \times H7$ | $H6 = 2.2 \times H7$ | $H6 = 2.75 \times H7$ | $H6 = 3.0 \times H7$ | $H6 = 2.6 \times H7$ |
| (mm) | H5 = 70 | H5 = 64 | H5 = 46 | H5 = 53 | H5 = 58 | H5 = 50 |
|  | H6 = 55 | H6 = 66 | H6 = 44 | H6 = 55 | H6 = 60 | H6 = 52 |
| Durability | 95 | 100 | 90 | 112 | 110 | 108 |
| Weight | 108 | 100 | 94 | 97 | 98 | 96 |

Figure 4:
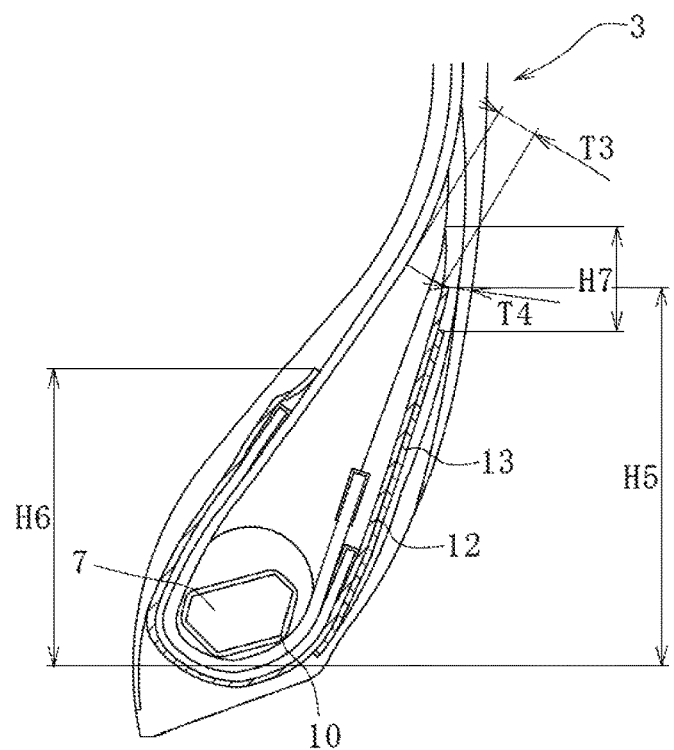
FIG. 4 is a meridian half sectional view of a pneumatic tire according to a comparison example 1.

In a comparison example 1, as shown in FIG. 4, an inner nylon chafer (nylon chafer: NC) 12 is disposed (wound) around a bead core 7, and a lower end portion of an outer nylon chafer 13 is disposed in the vicinity of a heel 10 (stopped at the heel). The relationship T4<T3 is set. A distance H5 is set to 3.5×H7 (H5=3.5×H7) so that the distance H5 is set to a value larger than an upper limit, value in the relationship (4). A distance H6 is set to 2.75×H7 (H6=2.75×H7) so that the distance H6 falls within a range of the relationship (4).

Figure 5:
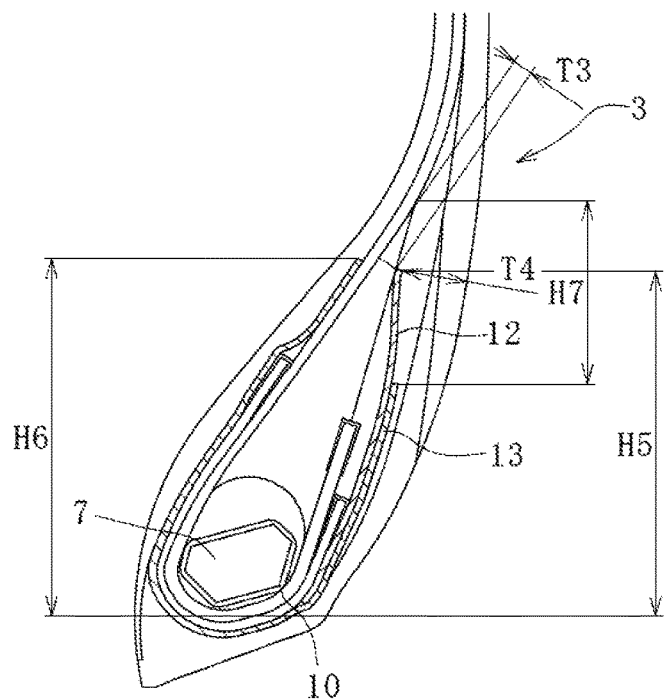
FIG. 5 is a meridian half sectional view of a pneumatic tire according to a comparison example 2.

In a comparison example 2, as shown in FIG. 5, a lower end portion of an inner nylon chafer 12 is disposed in the vicinity of a heel 10 of a head core 7, and an outer nylon chafer is disposed around the bead core 7. Further, the relationship T3<T4 is set. A distance H5 is set to 3.2×H7 (H5=3.2×H7) and a distance H6 is set to 3.3×H5 (H6=3.3× H5) so that both the distance H5 and the distance H6 are set to values larger than an upper limit value in the relationship (4).

Figure 6:
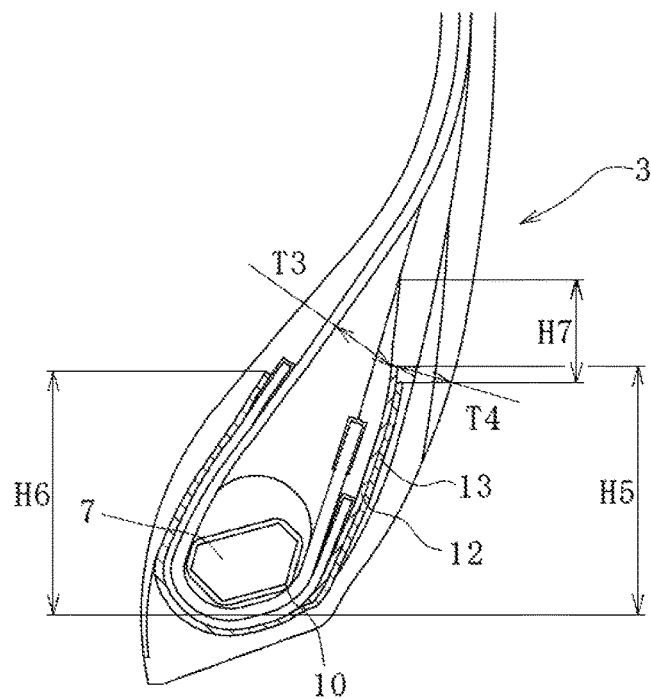
FIG. 6 is a meridian half sectional view of a pneumatic tire according to a comparison example 3.

In a comparison example 3, as shown in FIG. 6, a lower end portion of an inner nylon chafer 12 is disposed in the vicinity of a heel 10 of a bead core 7, an outer nylon chafer is disposed around the bead core 7. Further, the relationship T4<T3 is set. A distance H5 is set to 2.3×H7 (H5=2.3×H7), and a distance H6 is set to 2.2×H7 (H6=2.2×H7) so that both the distance H5 and the distance H6 are set to values lower than a lower limit value in the relationship (4).

Figure 7:
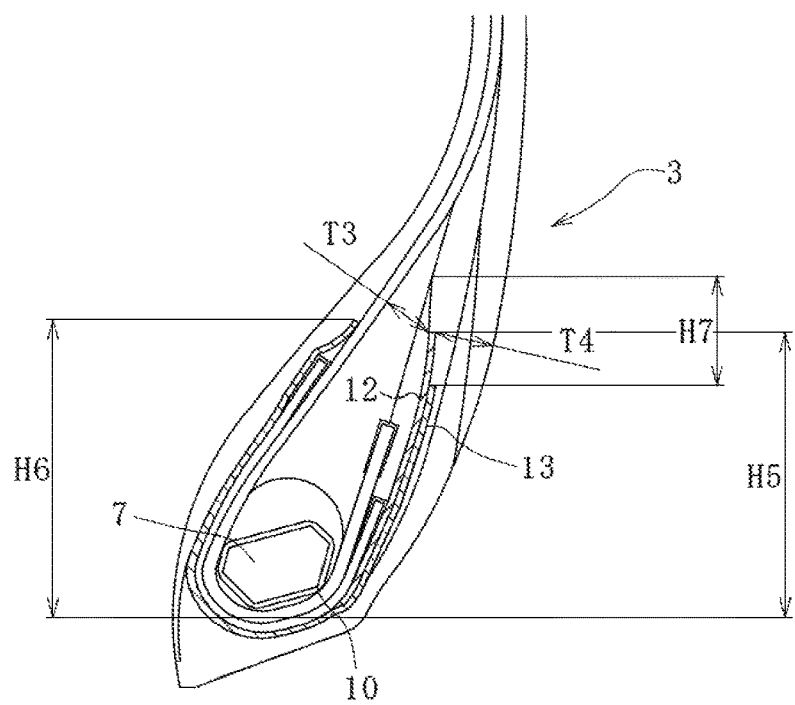
FIG. 7 is a meridian half sectional view of a pneumatic tire according to an example 1.

In an example 1, as shown in FIG. 7, a lower end portion of an inner nylon chafer 12 is disposed in the vicinity of a As can be clearly understood from the above-mentioned result, in the tires of the examples 1 to 3 where the lower end portion of the inner nylon chafer 12 is disposed in the vicinity of the heel of the bead core 7, the outer nylon chafer is disposed around the bead core 7, and both the distance H5 and the distance H6 are set to values which fall within the relationship (4), durability of the bead portion 3 can be enhanced, and the weight of the bead portion 3 can be suppressed. To the contrary, in the tire of the comparison example 1 where the inner nylon chafer 12 is disposed around the bead core 7 and the lower end portion of the outer nylon chafer 13 is positioned in the vicinity of the heel, a weight of the bead portion 3 is increased. Further, in the tire of the comparison example 3 where both the distance H5 and the distance H6 are set to values smaller than the lower limit value in the relationship (4), durability of the bead portion 3 is deteriorated.

What is claimed is:
1. A pneumatic tire comprising:
a pair of bead portions, and
a ply which extends between the pair of bead portions;
each of the pair of bead portions comprising;
a bead core;
a bead filler connected to the bead core;
one end side of the ply disposed along an outer surface of the bead core;
a steel chafer disposed outside the ply;

an inner nylon chafer disposed outside the steel chafer, the inner nylon chafer extending upward from a position in the vicinity of heels of the bead core; and an outer nylon chafer disposed outside the inner nylon chafer, wherein assuming a distance from a reference position of the bead core to an outer end portion of the steel chafer as H1, a distance from the reference position of the bead core to an outer end portion of the ply as H2, a distance from the reference position of the bead core to an outer end portion of the outer nylon chafer as H3, a distance from the reference position of the bead core to an inner end portion of the steel chafer as H4, and a distance from the reference position of the bead core to the upper end portion of the inner nylon chafer as H5, a following relationship is satisfied:

$$H1<H2<H3<H4<H5,$$

wherein all of following relationships are satisfied:

$$0.50 \times H2 \leq H1 \leq 0.70 \times H2,$$

$$1.10 \times H2 \leq H3 \leq 1.40 \times H2,$$

$$1.35 \times H2 — H4 \leq 1.60 \times H2,$$

$$1.15 \times H2 \leq H5 \leq 1.40 \times H2, \text{ and}$$

$$1.40 \times H2 \leq H6 \leq 1.65 \times H2$$

2. The pneumatic tire according to claim 1, further comprising an outer rubber layer outside of the outer nylon chafer, wherein assuming a shortest distance between an inner edge of the upper end portion of the inner nylon chafer and an inner surface of the bead filler continuously formed with the bead core as T3, and a shortest distance between an outer edge of the upper end portion of the inner nylon chafer and an outer surface of the outer rubber layer as T4, a following relationship is satisfied:

$$1.1 \times T3 < T4 < 1.5 \times T3.$$

3. The pneumatic tire according to claim 1, wherein
a rubber layer is disposed between the bead filler and the inner nylon chafer,
assuming a distance from the reference position of the bead core to the inner end portion of the outer nylon chafer as H6, the distance H5 is substantially equal to the distance H6, and
assuming a distance from the outer end portion of the outer nylon chafer to an upper end portion of the rubber layer as H7, a following relationship is satisfied:

$$2.5 \times H7 \leq H5(H6) \leq 3.0 \times H7.$$

4. The pneumatic tire according to claim 1, wherein
assuming a height of the tire as H, a following relationship is satisfied:

$$0.10 \times H \leq H2 \leq 0.25 \times H.$$

5. The pneumatic tire according to claim 1, further comprising an outer rubber layer outside of the outer nylon chafer, wherein assuming a shortest distance between an inner edge of the outer end portion of the outer nylon chafer and an inner surface of the bead filler as T1, and a shortest distance between an outer edge of the outer end portion of the outer nylon chafer and an outer surface of the outer rubber layer as T2, a following relationship is satisfied:

$$1.5 \times T2 < T1 < 2.0 \times T2.$$

6. The pneumatic tire according to claim 5, further comprising an outer rubber layer outside of the outer nylon chafer, wherein assuming a shortest distance between an inner edge of the upper end portion of the inner nylon chafer and an inner surface of the bead filler continuously formed with the bead core as T3, and a shortest distance between an outer edge of the upper end portion of the inner nylon chafer and an outer surface of the outer rubber layer as T4, a following relationship is satisfied:

$$1.1 \times T3 < T4 < 1.5 \times T3.$$

7. The pneumatic tire according to claim 5, wherein
a rubber layer is disposed between the bead filler and the inner nylon chafer,
assuming a distance from the reference position of the bead core to the inner end portion of the outer nylon chafer as H6, the distance H5 is substantially equal to the distance H6, and
assuming a distance from the outer end portion of the outer nylon chafer to an upper end portion of the rubber layer as H7, a following relationship is satisfied:

$$2.5 \times H7 \leq H5(H6) \leq 3.0 \times H7.$$

8. The pneumatic tire according to claim 5, wherein
assuming a height of the tire as H, a following relationship is satisfied:

$$0.10 \times H \leq H2 \leq 0.25 \times H.$$

* * * * *